Figure 1:
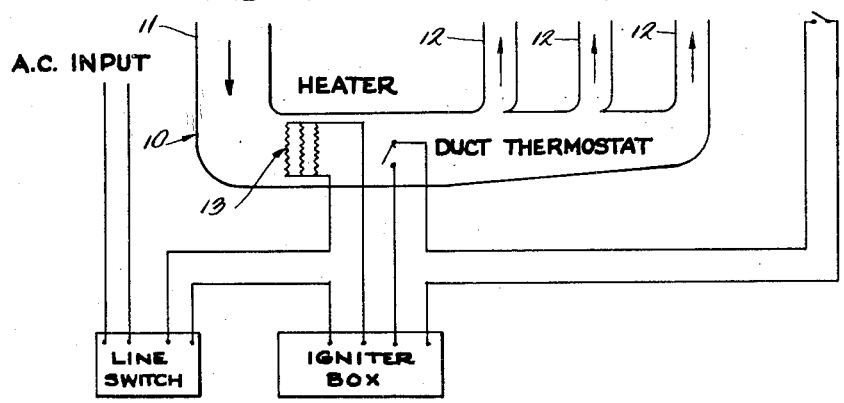

April 12, 1949.  J. E. GANNON  2,467,084
CONTROL CIRCUITS

Filed June 1, 1946  2 Sheets-Sheet 1

JAMES E. GANNON
INVENTOR

BY Michael Williams
ATTORNEY

April 12, 1949.　　　　J. E. GANNON　　　　2,467,084
CONTROL CIRCUITS
Filed June 1, 1946　　　　　　　　　　　　　　2 Sheets—Sheet 2
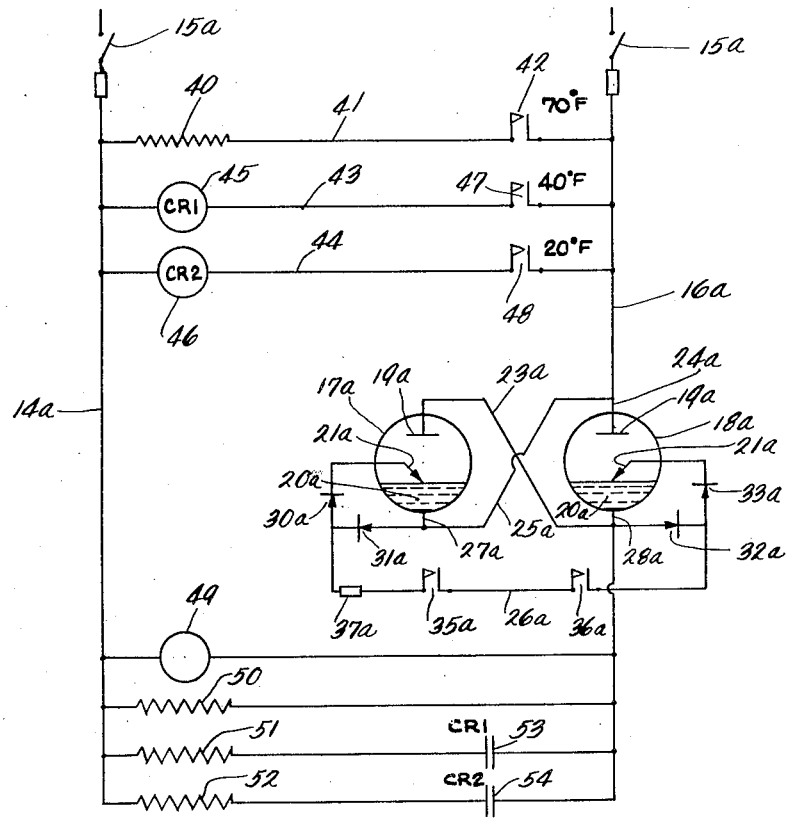
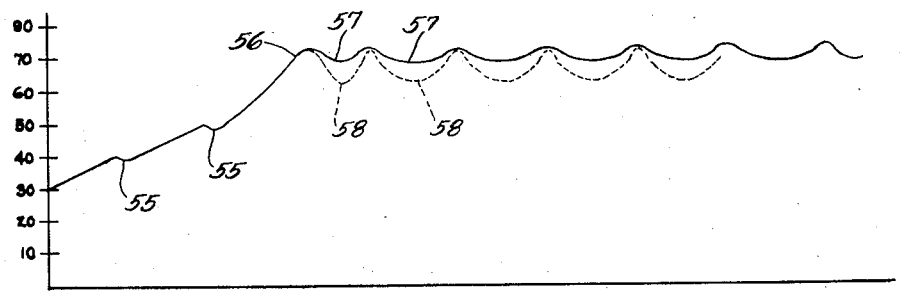
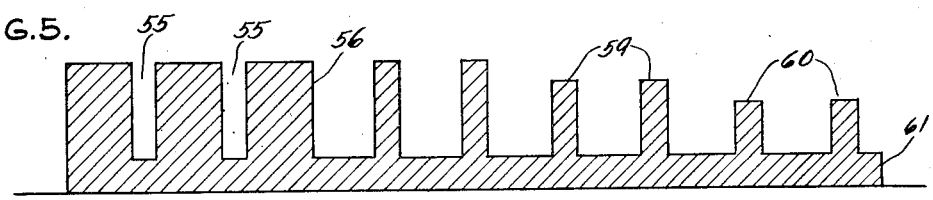
JAMES E. GANNON
INVENTOR
BY Michael Williams
ATTORNEY Patented Apr. 12, 1949

2,467,084

UNITED STATES PATENT OFFICE 2,467,084

CONTROL CIRCUITS

James E. Gannon, Erie, Pa., assignor to American Electric Heating Company, Erie, Pa., a partnership Application June 1, 1946, Serial No. 673,743

3 Claims. (Cl. 219—20)

1

My invention relates to control circuits, more particularly to control circuits for electrical heating systems, and the principal object of my invention is to provide new and improved circuits of the character described.

Present day control circuits for electrical heating systems are either unreliable and noisy in operation, or complicated and expensive in nature. In the former class may be grouped such controls which employ relays to operate the contactor switches used to connect or disconnect the resistors with the current source. In this group, and with a close setting of the thermostat or other temperature responsive device, the noise of the contactors as they make and break the circuit is of considerable annoyance. In the latter class may be grouped complicated circuits which control heat by phase shifting, such as is shown in the patent issued to E. D. Schneider, Number 2,250,207, or by capacitor discharge, as shown in the patent issued to H. L. Palmer, et al., Number 2,364,998.

My invention combines simplicity of control and construction with reliability and quietness of operation, and thus provides desirable features lacking in the prior art, especially that mentioned.

In addition, my invention provides means for eliminating so-called "cold-seventy" temperature in an area heated, and also provides means for relating the operation of the heating system with the outside temperature. These features, further combined with the features hereinbefore mentioned, provide control means for an electrical heating system that possess all the requirements necessary for modern electric heating.

Figure 2:
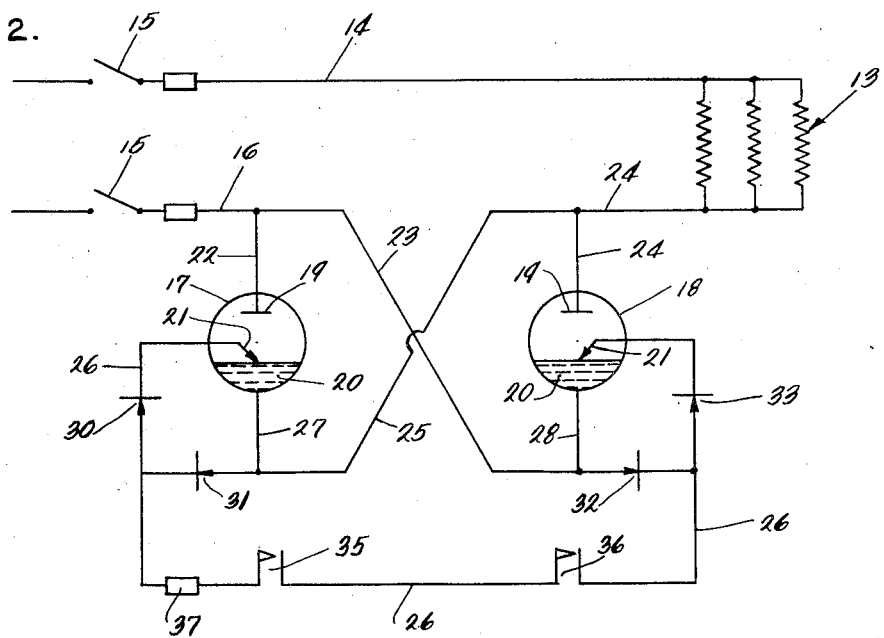

In the drawings accompanying this application, and forming a part of this specification, I have shown, for purposes of illustration, several embodiments which my invention may assume, and in these drawings:

Figure 1 is a generally schematic representation of an embodiment of my invention as applied to a conventional heating system, Figure 2 is an electrical representation of the control circuit used in Figure 1, Figure 3 is an electrical representation of another embodiment of the invention, and Figures 4 and 5 are graphic illustrations of the heat curve and energy cycles, respectively, of the embodiment shown in Figure 3.

Referring particularly to Figure 1, the invention may be applied to a conventional heating system comprising duct work 10, having an air return 11, and risers 12 leading to various rooms to be heated. Resistor means 13 may be housed

2 within the duct work 10 in any suitable manner and at any desired location. The resistor means may be composed of one or more heating elements, depending upon heating requirements.

As best shown in Figure 2, one side of the resistor means 13 is connected, by conductor 14, to one side of a source of current, a fused, line disconnect switch 15, preferably being interposed in both sides of the current source for protection purposes. The source, as is usual in most cases, is alternating current.

The other side of the current source is connected, by conductor 16, to an electric valve means which is so constructed and electrically connected to pass alternating current to the resistor means 13. It will be appreciated that the valve means herein employed provides switch means for controlling flow of electric current to the resistor means 13.

Preferably, the valve means comprises electron tubes of the mercury vapor type, such as the ignitron type commercially available. In the particular embodiment shown, two ignitron tubes 17 and 18 are used, each tube having an anode 19, a cathode 20 which is generally in the form of a mercury pool, and a starter or igniter 21 which dips into the mercury pool.

The tubes 17—18 are so connected as to operate like a single-pole magnetic contactor, but without the movement or noise inherent in operation of such contactors. The tubes, as shown, are connected in so-called back-to-back relation, so as to pass both halves of the alternating current. Thus, conductor 16 is connected, by conductor 22, to anode 19 of tube 17, and is also connected, by conductor 23, to cathode 20 of tube 18. The opposite side of resistor means 13 is connected, by conductor 24, to anode 19 of tube 18, and is also connected, by conductor 25, to cathode 20 of tube 17. This is the so-called back-to-back relation.

Since ignitron tubes have the characteristic of not being able to pass current until started by some means, the igniters 21 are included in the circuit, and as herein shown, igniters 21 are connected together by a conductor 26. Cathode 20 of tube 17 is connected to conductor 26 and conductor 25 by branch conductor 27, and cathode 20 of tube 18 is connected to conductor 26 and conductor 23 by branch conductor 28.

Keeping in mind that alternating current is of such characteristic that it flows alternately in opposite directions, for purposes of explanation of the operation, it will be assumed that the current first flows from conductor 16 through the resistor means 13 and to the conductor 14. To do this, the current must also flow through one of the ignitron tubes. Since it is a generally accepted theory that current in an ignitron tube can only flow from anode to cathode, current, under the assumed conditions, can pass through tube 17 but not through tube 18. Therefore, current under these conditions will flow from conductor 16, through conductor 22, through tube 17, conductor 25, resistor means 13, and to conductor 14. At the instant the current reverses, there is no current flow, but thereafter current will flow from conductor 14, through resistor means 13, conductor 24, through tube 18, conductor 23, to conductor 16. Of course, tubes 17, 18 will pass line current only if current is first forced into their igniters.

Current can be made to pass in either direction between the igniter and cathode, but the igniter will be damaged if current flows from the mercury-pool cathode into the igniter. Therefore, rectifiers 30, 31 are inserted in the lines including the igniter 21 of tube 17, and rectifiers 32, 33 are inserted in the lines including the igniter 21 of the tube 18 so that full current will be passed through the rectifiers in the direction of the arrows shown in Figure 2, and little or no current will be passed in the opposite direction. The rectifiers may be of the copper oxide type.

To control operation of the igniters 21, and therefore operation of the tubes 17, 18, switch means are included in the circuit. As herein disclosed, switch means 35, 36 are included in series relation in the circuit, the switch 35 being actuated by a thermostat in the area to be heated, which thermostat may be termed the room thermostat. The switch 36 is actuated by a thermostat located adjacent the resistor means 13, which thermostat may be termed the duct thermostat. The duct thermostat prevents overheating of the resistor means 13 during the time the room thermostat is calling for heat, and also provides a means of regulating the heat of the resistor means 13 to regulate the temperature of the air delivered to the area to be heated.

In the commercially available ignitron tubes, as soon as line current flows through an ignitron tube, the arc drop across the tube decreases to about 15 to 20 volts, and this small voltage cannot force current through the starter or igniter circuit, so the igniter current stops flowing as soon as the main line current flows through the respective ignitron tube. If the ignitron tube should fail to pass line current, the starter current would continue to flow and would overload the starter and rectifiers. Accordingly, a protective fuse 37 is inserted in the circuit to safeguard against this condition.

In operation, with both room and duct thermostats calling for heat, during one-half of the A. C. wave, current flows from conductor 16, through conductor 23, rectifier 32, conductor 26, closed switches 36, 35, fuse 37, rectifier 30 and into igniter 21 of tube 17, through anode 29 of tube 17, through conductor 25, resistor means 13, and to conductor 14. This igniter current will make tube 17 fire, passing the load current directly through conductors 25, 24, resistor means 13, and to conductor 14.

During the opposite half of the A. C. wave, current flows from conductor 14 through resistor means 13, conductor 25, rectifier 31, fuse 37, closed switches 35, 36, rectifier 33, to igniter 21 of tube 18, through cathode 20 of tube 18, conductor 23, and to conductor 16. This igniter current fires tube 18, which passes load current directly through conductor 23 to conductor 16.

Of course, it will be understood that circuit operation is under direct control of the room and duct thermostats, so that if either thermostat is not calling for heat, it will cause its switch to open the circuit.

Referring to Figure 3, a control circuit similar to the control circuit hereinbefore described is used, and parts similar to those of Figure 2 will bear the same reference numeral but supplemented with the suffix $a$.

In this embodiment, the conductors 14a and 16a lead to a source of alternating current, the usual fused, disconnect switches 15a being interposed in these lines. A heater unit 40 is connected across the conductors 14a, 16a, by means of a conductor 41, a thermostatically controlled switch 42 being interposed in this conductor.

Also connected across the conductors 14a, 16a, as by means of conductors 43, 44 are the motor portions 45, 46 of relays CR1 and CR2, thermostatically controlled switches 47, 48 being interposed in respective conductors 43, 44.

Beyond the ignitron tubes 17a, 18a, and under control thereof, are a blower motor 49, and resistor means comprising a series of units, here shown to be three in number and respectively designed 50, 51, and 52. Contacts 53 of relay CR1 also control heater unit 51, and contacts 54 of relay CR2 also control heater unit 52.

The thermostats controlling switches 42, 47, and 48 are located outside of the area to be heated, and are preferably responsive to variations in temperatures outside of a building. For illustration purposes, the thermostat controlling switch 42 may be set to cut in the heating unit 40 when the outside temperature drops below 70° F. Further, the thermostats controlling switches 47, 48 may be respectively set to actuate the relays CR1, CR2 to provide for energization of the heating units 51, 52 when the outside temperature drops, for example, below 40° and 20° F., respectively. Of course, these units 51, 52 will not be energized until the respective outside temperatures are reached and the ignitron tubes 17a, 18a are passing line current.

In the embodiment shown in Figure 3, the heating unit 40 will be energized any time the outside temperature drops below, as an example, 70° F., regardless of whether or not the ignitron tubes are passing line current. When the outside temperature drops, as an example, below 40° F., the relay CR1 is energized to close contacts 53 to permit heating unit 51 to be included in circuit when tubes 17a, 18a pass line current. And, when the outside temperature drops, as an example, below 20° F., the relay CR2 is energized to close contacts 54 to permit heating unit 52 to be included in circuit when tubes 17a, 18a pass line current. Heating unit 50, as in the case of resistor means 13, is only under control of tubes 17a, 18a.

It will be appreciated that each of the heating units may comprise one or more resistors, and these units may all be grouped in one locality, or may be positioned as desired. Preferably, all heating units are located in the duct work 10 to receive air moved by the blower 49.

Figures 4 and 5 respectively illustrate graphically the heat curve and the energy supplied, starting from a condition when the outside temperature is below 20° F. In this case, when the room thermostat and duct thermostat (controlling switches 35a and 36a) are calling for heat, all of the heating elements 40, 50, 51, and 52 will be energized.

When the duct temperature reaches a predetermined amount, as determined by the setting of the duct thermostat, all but the heating element 40 will be deenergized, and this is indicated by the numeral 55 in Figures 4 and 5. When the room temperature reaches the setting of the room thermostat, for example 70° F., the room thermostat will take over the control and will cause deenergization of all the heating elements, except the element 40. This is shown by numeral 56.

Latent heat will cause the temperature to rise slightly above 70° F., and the room will start cooling until it against drops to 70° F., when the room thermostat will again cause energization of the heating elements 50, 51, and 52. However, since these elements are starting from cold condition, the room temperature will drop as shown by numeral 57, until the heat of these elements again affects the temperature of the room.

By use of my invention, this drop below the setting of the room temperature will not be as pronounced as the customary drop shown in dotted lines 58, since the heating means 40 is constantly energized and a certain amount of heat is continuously available for the room. Further, when the blower motor 49 is actuated, heated air will be delivered to the room, despite the fact that the heating elements 50, 51, and 52 are starting from a cold condition. In this manner, what is termed by the trade as "cold-seventy" is eliminated. It will be appreciated that the term "cold-seventy" would be modified, depending upon the setting of the room thermostat.

In the case where the outside temperature, as in the example herein disclosed, rises above 20° F., the heating element 52 will not be cut in by the tubes 17a, 18a, since because of the relatively warmer outside temperature, less energy will be required. This condition is shown at 59 in Figure 5. Further, if the outside temperature, as in the example herein disclosed, rises above 40° F., only the heating element 50 will be cut in by the tubes 17a, 18a, and the energy supplied is illustrated by numeral 60 in Figure 5. Finally, if the outside temperature, as in the example herein disclosed rises above 70° F., the heating element 40 will be deenergized, and unless the room thermostat is set above 70° F., all heating elements will be out of operation, and the energy supply will drop to zero, as shown by numeral 61 in Figure 5.

From the foregoing, it will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. A control circuit for an electrical heating system for a building, adapted to control energy from an alternating current source, comprising: first heating element means; electric valve means, so constructed and electrically connected to pass alternating current to said first heating element means, said first heating element means comprising units all under control of said electric valve means; interior thermostat means, for controlling operation of said valve means; first exterior thermostat means; switch means, actuated by said first exterior thermostat means, and connected in series with said valve means for controlling energization of at least certain of said units; second heating element means; second exterior thermostat means; and switch means, actuated by said second exterior thermostat means, for controlling energization of said second heating element means.

2. An electric heating system, comprising: heating element means connectable to a current source and comprising a plurality of sections; thermostatically controlled switch means affected by the temperature without the area to be heated, and controlling current flow to certain of said sections; thermostatically controlled switch means, affected by the temperature of the area to be heated, for controlling current flow to all the remaining sections of said heating element means; and a plurality of thermostatically controlled switch means affected by the temperature without the area to be heated, said plurality of switch means being operable at different temperatures and each at a temperature lower than the setting of said first named thermostatically controlled switch means, and said second switch means controlling current flow to only certain respective sections of said remaining sections.

3. An electric heating system, comprising: a first heating element; first thermostatically controlled switch means affected by temperature without the area to be heated, and set to energize said first heating element when such temperature drops below a point accepted as normally comfortable to humans; a second heating element, comprising a plurality of sections; second thermostatically controlled switch means, affected by temperature within the area to be heated, for controlling current flow to all sections of said second heating element; and third thermostatically controlled switch means, affected by temperature without the area to be heated, for controlling current flow to certain of the sections of said second heating element, said third switch means being set to energize said certain sections at a temperature lower than the setting of said first switch means.

JAMES E. GANNON.

REFERENCES CITED

The following references are of record in the file of this patent:

UNITED STATES PATENTS

| Number | Name | Date |
|---|---|---|
| 1,044,269 | Shaler | Nov. 12, 1912 |
| 1,708,309 | Knaak | Apr. 9, 1929 |
| 2,058,252 | Parsons | Oct. 20, 1936 |
| 2,062,337 | Stewart | Dec. 1, 1936 |
| 2,080,799 | Wiegand | May 18, 1937 |
| 2,088,477 | Knowles | July 27, 1937 |
| 2,168,680 | Nordgren | Aug. 8, 1939 |
| 2,250,207 | Schneider | July 22, 1941 |

FOREIGN PATENTS

| Number | Country | Date |
|---|---|---|
| 389,216 | Great Britain | Mar. 16, 1933 |